United States Patent [19]

Arques et al.

[11] Patent Number: 4,948,966
[45] Date of Patent: Aug. 14, 1990

[54] METHOD FOR THE READING OF PHOTOSENSITIVE CELLS OF THE TYPE COMPRISING TWO SERIES-MOUNTED DIODES WITH DIFFERENT DIRECTIONS OF CONDUCTION

[75] Inventors: Marc Arques, Grenoble; Lucien Guyot, Paris, both of France

[73] Assignee: Thomson-CSF, Putsaux, France

[21] Appl. No.: 406,150

[22] Filed: Sep. 12, 1989

[30] Foreign Application Priority Data

Sep. 16, 1988 [FR] France ................. 88 12126

[51] Int. Cl.$^5$ ............................................. H01J 40/14
[52] U.S. Cl. ............................ 250/208.1; 358/213.11
[58] Field of Search ............ 250/208.1, 211 R, 211 J; 358/213.11, 213.31

[56] References Cited

U.S. PATENT DOCUMENTS 4,499,384 2/1985 Segawa et al. ................. 358/213.11
4,785,191 11/1988 Ondris ................. 358/213.11
4,826,777 5/1989 Ondris ................. 250/208.1

FOREIGN PATENT DOCUMENTS

0245147 4/1987 European Pat. Off. .
2605166 10/1986 France .

Primary Examiner—David C. Nelms
Assistant Examiner—Khaled Shami
Attorney, Agent, or Firm—Roland Plottel

[57] ABSTRACT

The disclosure concerns the reading of the photocharges generated by the illumination of a matrix of photosensitive dots. The dots are formed by a photosensitive diode in series with a reading diode, all between a row and a column of the matrix. To reduce the reading errors, there is provision to illuminate the photosensitive dots with a constant illumination which gets added to the illumination to be measured, thus creating driving charges that get added to the useful charge and facilitate its transfer to a reading register.

6 Claims, 5 Drawing Sheets

FIG_1

FIG_2a

FIG_2b

FIG_2c

FIG_2d

METHOD FOR THE READING OF PHOTOSENSITIVE CELLS OF THE TYPE COMPRISING TWO SERIES-MOUNTED DIODES WITH DIFFERENT DIRECTIONS OF CONDUCTION

BACKGROUND OF THE INVENTION

1. Field of the Invention

The invention pertains to the field of the reading of photosensitive cells, notably of the solid-state type, where each cell comprises two diodes mounted in series and mounted upside down with respect to each other, i.e. with opposite directions of conduction, at least one or these two diodes being a photodiode. A particular object of the method according to the invention is to increase the reading speed while, at the same time, preserving the precision and quality required in this reading, especially when the photosensitive cell has been exposed to a low intensity useful signal.

2. Description of the Prior Art

It is common practice to use, for example, photosensitive cells in solid state photosensitive devices wherein the photosensitive cells are placed in a matrix arrangement and form a photosensitive matrix. A photosensitive matrix has a system of conductors in rows and a system of conductors in columns. At each intersection between a row conductor and a column conductor, there is a photosensitive assembly or photosensitive cell hereinafter called a photosensitive dot. The photosensitive dots are thus organized in both rows and columns. Each photosensitive dot is connected between a row conductor and a column conductor. In fact, to each row conductor, there are connected as many photosensitive dots as there are columns of these dots and, to each column conductor, there are connected as may photosensitive dots as there are rows of these dots.

The number of photosensitive dots in a given surface determines the resolution of the image. There are known ways to make high capacity matrices of photosensitive elements, for example with 2000×2000 photosensitive dots, to obtain an image with dimensions of the order of 40 cm. by 40 cm. In this case, each photosensitive dot is located in an elementary surface zone, the maximum dimensions of which are 200 micrometers by 200 micrometers. An arrangement such as this enables the making of surface-type detectors which may be applied, notably, to radiology, provided that a scintillator is added, to the detection of particles (electrons, neutrons, etc.) and to reproduction graphics.

Each photosensitive dot has a photosensitive element such as a photodiode or phototransistor, sensitive to the visible or near visible light photons. These light photons are converted into electrical charges, and these electrical charges get collected in an electrical capacitor forming a storage capacity which may be formed by the capacitor of the photosensitive dot itself. A reading device can be used to interrogate the electrical status of the storage capacity and to convey the electrical charge, constituting the signal, towards a signal amplifier.

One of the main problems raised by the reading of photosensitive dots lies in an excessively great value of the electrical capacitance of the photosensitive cells. The effect of this capacitance is exerted particularly during the reading of the photosensitive dots, i.e. during the amplification of the photocharge developed by a photosensitive element, a photodiode for example, following its illumination. This capacitance of each photosensitive element is applied to the column conductors and to the reading amplifier to which this element is connected, and tends to cause deterioration in the signal-to-noise ratio.

It has to be further noted that it is desirable to avoid the application, to a column conductor and to the corresponding reading amplifier, of the capacitance of the photosensitive elements connected to row conductors other than the row conductor that is addressed at a given instant, i.e. it is desirable to achieve efficient uncoupling of the non-addressed photosensitive dots with respect to the column conductor. This means that each photosensitive cell must have an element acting as a switch kept in the open state, except during the stage for reading the photosensitive cell to which it belongs. With a view to simplifying the fabrication of solid state photosensitive matrices, a known way to fulfil the above-mentioned switch function is to use a diode series mounted with the photosensitive element.

An arrangement such as this is described in a French patent application No. 86 14058, publication No. 2 605 166, filed on 9th October 1986 on behalf of THOMSON-CSF. This patent application relates to a solid state photosensitive device, the method of its reading and the method of its fabrication. This patent application particularly describes a photosensitive device, which may be have a matrix or linear arrangement, wherein each photosensitive dot is formed by a photosensitive cell consisting of two diodes, mounted in series and upside down with respect to each other, i.e. with opposite directions of conduction. A first diode is connected to a row electrode, and the second diode is connected to a column electrode. In the example described in this patent application, the first diode has a capacitance which is about ten times smaller than the capacitance of the second diode. The result thereof is a reduction in the equivalent capacitance brought to a column conductor by each photosensitive cell connected to this column conductor. Furthermore, the reading method used is such that the first diode works like a switch which is put in the closed state solely during the phase for reading the cells connected to the row conductor to which it belongs. The result thereof is efficient uncoupling of the column conductors with respect to the photosensitive cells of the non-addressed lines.

However, a photosensitive cell, formed by an assembly of two diodes, mounted in series and upside down with respect to each other, the working of which is got by a standard reading method as described in the above mentioned document, has certain major drawbacks, especially the drawback of introducing a possibly considerable error in the reading of the charges generated at a photosensitive dot during the exposure of this dot to a light signal to be picked up. This fault is all the more pronounced as the signal is weak and as it is sought to obtain a high reading speed.

The method of the invention makes it possible to avoid these drawbacks, and is applicable to the reading of photosensitive dots or cells comprising two diodes, mounted in series and upside down with respect to each other as explained above.

SUMMARY OF THE INVENTION

According to the invention, there is proposed a method for the reading of at least one photosensitive dot comprising a first diode and a second diode, mounted in series, with, opposite directions of conduction, at least one of the diodes being photosensitive, said method consisting in the reverse biasing of the two diodes during the exposure of the photosensitive dot to a useful signal, so as to accumulate a quantity of signal charges in a zone with floating potential located at the connection between the two diodes, then in the forward biasing of the first diode during the stages of reading by periodic reading pulses, said method further consisting in the illumination of the photosensitive dot by an additional illumination to generate, in the zone with floating potential, driving charges which get added at least partially to the signal charge.

BRIEF DESCRIPTION OF THE DRAWINGS

The invention will be better understood from the following description, given as a non-restrictive example, and from the five appended figures, among which.

DETAILED DESCRIPTION OF THE INVENTION

Figure 1:
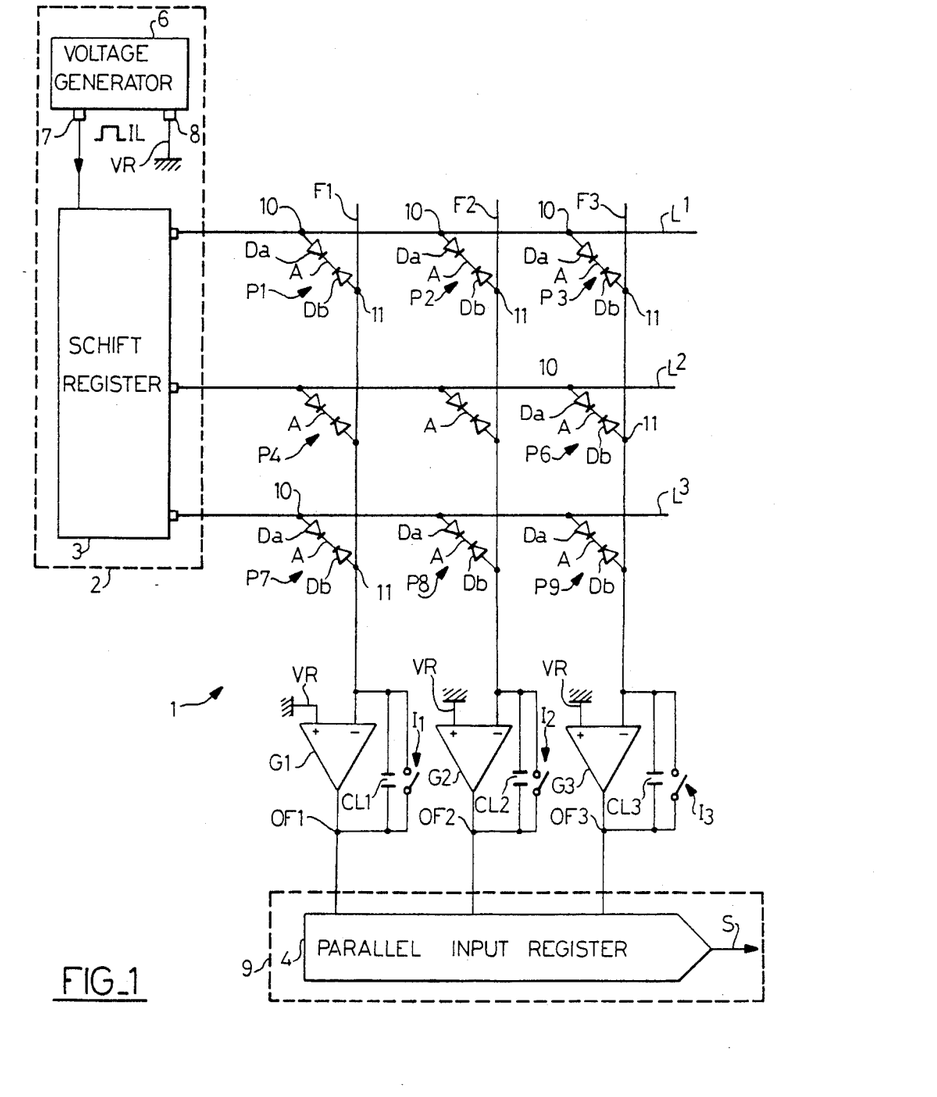
FIG. 1 schematically shows a matrix of photosensitive dots of the type to which the method of the invention can be applied.

FIG. 1 gives a non-restrictive exemplary view of the electrical diagram of a photosensitive matrix 1. This electrical diagram is itself a standard one. For, the matrix has a plurality of photosensitive dots P1 to P9 each formed by photosensitive cells as described in the French patent application No. 86 14058 mentioned above, i.e. each photosensitive dot or cell is formed by two diodes Da, Db, mounted in series and upside down with respect to each other, i.e. with opposite directions of conduction.

In the non-restrictive example described, the number of photosensitive dots P1 to P9 is restricted to 9 according to a 3×3 matrix assembly, in order to simplify FIG. 1. However, in the spirit of the invention, this matrix assembly may have a far greater capacity, of several millions of dots for example.

The matrix 1 has conductors L1 to L3 in rows and conductors F1 to F3 in columns, the number of each type of these conductors being restricted to three in view of the example of the figure where only 9 photosensitive dots P1 to P9 are shown.

In practice, and in a manner which is standard in itself, the photosensitive dots P1 to P9 are each formed at the intersection of a row conductor L1 to L3 and a column conductor F1 to F3. Each photosensitive dot P1 to P9 has a first end 10 connected to a row conductor L1 to L3, and has a second end 11, connected to a column conductor F1 to F3. In the non-restrictive example described, for each photosensitive dot P1 to P9, the first diode Da is connected to a row conductor L1 to L3 by its anode which forms the first end 10, and the second diode Db is connected to a column conductor F1 to F3, also by its anode which forms the second end 11.

In a known way, each of the diodes Da, Db forms a capacitor Ca, Cb when this diode is reverse biased. In the case of the photosensitive diodes P1 to P9, the capacitance of the capacitor Cb, formed by the second diodes Db, is about 10 times greater than the capacitance of the capacitor Ca of the first diodes Da. The first diodes Da have to fulfil chiefly a switch function as taught by the above-mentioned patent application.

The row conductors L1 to L3 are connected to a row addressing device 2 which comprises, notably, a logic shift register 3 that provides for the sequential addressing of each row L1 to L3 with a view to the reading of the photosensitive dots P1 to P9 which are connected to this row. The register 3 enables the application of a voltage VL in pulse form, called a reading pulse IL, from row conductor to row conductor, while the other non-addressed row conductors are kept at a reference potential VR. The reading voltage pulses IL are given by a voltage pulse generator 6, one output 7 of which is, to this end, connected to the shift register 3 while its other output 8 is connected to the reference voltage VR which is the ground in the non-restrictive example described. The reading pulses IL enable the reading of the photosensitive dots P1 to P9, that is, they make enable the transfer, to the column conductors, of the charges generated by an illumination signal or useful signal (not shown) to which each photosensitive dot may be exposed. These charges, which are proportionate to the intensity of the illumination, are stored in a zone formed at the connection between the two diodes Da and Db of each photosensitive dot P1 to P9, this zone or connection between these two diodes being symbolized, in the figure, by a point marked A, and forming a point with floating potential, for its potential varies with the quantity of charges that collect therein. This quantity of charges may be generated by either of the two diodes Da, Db, or by both these diodes depending on whether either of them is or both of them are photosensitive. However, preferably, it is the second diode Db, which has the greatest capacitance, that should be photosensitive while the first diode Da, the main function of which is that of a switch, may possibly be not photosensitive.

Furthermore, each column conductor F1 to F3 is connected to the negative input "−" of an operational amplifier G1 to G3 mounted as an integrator, by means of an integration capacitor CL1 to CL3. Each integration capacitor is mounted between the negative input "−" of the amplifier G1 to G3, and the output OF1, OF2, OF3 of this amplifier. The second input or positive input "+" of each amplifier GF1 to GF3 is connected to a column reference potential which imposes this reference potential on each column conductor F1 to F3. This potential may or may not be the same potential VR as that of the row addressing device. Hereinafter, it shall be assumed, to simplify the description, that the reference potential is the same for the rows and the columns.

Each integrator amplifier G1 to G3 further includes a resetting switch I1 to I3, mounted in parallel with the integration capacitor CL1 to CL3. In FIG. 1, switches I1 to I3 are depicted as switches but, of course, in a standard way, they may consist of transistors, of the MOS type for example, controlled by resetting signals (not shown).

The outputs OF1 to OF3 of the amplifiers GF1 to GF3 are connected to reading and multiplexing means 9 comprising, for example, an analog data acquisition device 4, formed by a shift register with parallel input and series output S, of the CCD (charge-coupled device) type, for example. Thus, in a standard way, the analog data acquisition device can serially put out signals (not shown) that correspond to the charges that have been integrated by the amplifiers G1 to G3, in the stage for reading all the photosensitive dots connected to one and the same row conductor L1 to L3.

FIGS. 2a to 2e illustrate the working of any photosensitive dot P1 to P9 of the matrix 1 shown in FIG. 1, the first photosensitive dot P1 for example, in a case where its operation is obtained by a prior art reading method.

Figure 2A:
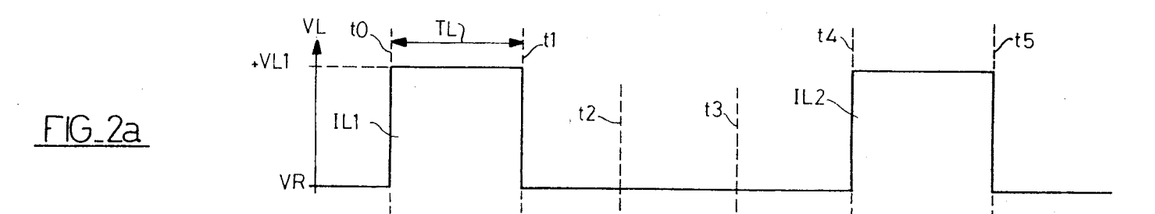
FIGS. 2a to 2d are graphs of signals explaining a standard method for reading the photosensitive dots shown in FIG. 1.

FIG. 2a shows that each photosensitive dot, namely the first photosensitive dot P1 in the example, periodically receives reading pulses IL1, IL2 which are formed by voltage pulses V1 and have an amplitude VL1 that is positive with respect to the reference potential VR which is applied to the row electrodes L1 to L3 when there are no reading pulses IL1, IL2.

Figure 2B:
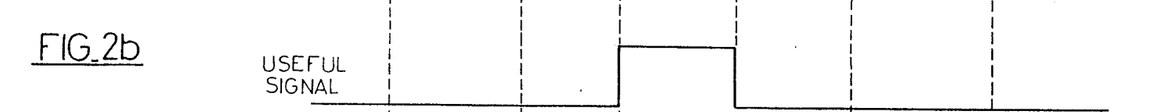

FIG. 2b shows that the photosensitive dot, between two reading pulses, receives a signal illumination which may be continuous or else pulsed as shown in FIG. 2b.

Figures 2C, 2D:
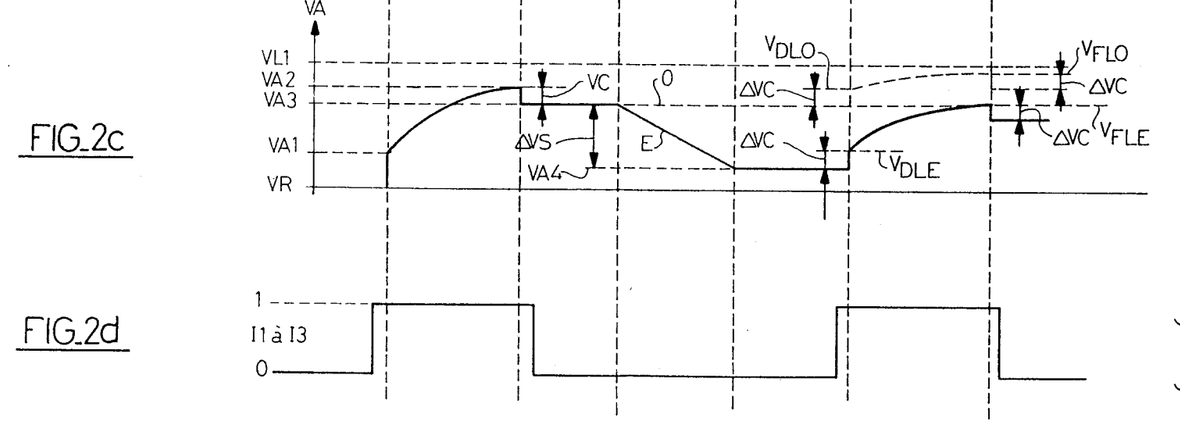

FIG. 2c shows the modifications of the potential Va at the point A due to the application of the reading pulses and the application of the illumination signal. FIG. 2d makes it possible to locate the periods during which the resetting switches I1 to I3 go from the closed state (0) to the open state (1) so as to enable the charges, read by means of the reading pulses, to be integrated (in the open state) by the amplifiers G1 to G3. However, the switch opening pulses are represented only during the time intervals concerning the line during reading.

At the instant t0: it is seen in FIG. 2a that a first reading pulse IL1 starts. This pulse has a duration TL from the instant t0 to the instant t1. At the instant t0, with the rising edge of the reading pulse IL1, there is an increase in the voltage VA at the point A. This voltage goes, for example, if the instant t0 is at the start of the operation, from the reference voltage VR to a voltage VA1, from which onwards the first diode Da begins to be forward biased and tends towards the value VL1, according to an almost exponential curve, notably because the second diode Db is reverse biased and forms a capacitor Cb.

At the instant t1: the reading pulse IL1 returns to zero, i.e. to the value of the reference voltage VR, while the voltage VA at the point A has reached a value VA2 which is smaller than the value VL1 of the reading pulse IL1. With the second diode Db being charged at the value VA2, the first diode Da (the smaller of the two diodes) gets blocked, i.e. it goes into reverse bias, and the voltage VA at the point A decreases by capacitive division until it reaches a value VA3, and shows a variation $-\Delta VC$, such that:

$$-\Delta VC = -VL1 \cdot \frac{Ca}{Ca + Cb}$$

where Ca and Cb are respectively capacitances of the first and second diodes Da and Db when these diodes are reverse biased, and where VL1 is the amplitude of the reading voltage pulse VL.

At an instant t2, there starts an illumination phase in which the photosensitive dot may be exposed to a light signal to be picked up. It must be noted that, between the instant t1 and the instant t2, the voltage VA at the point A may decrease very slightly because of the dark currents of the first and second diodes Da and Db but, to simplify the description, we have not represented the effect of these dark currents.

The stage of illumination by a useful signal to be picked up is from instant t2 to the instant t3, and this illumination may be the maximum, or it may be zero to the point where the photosensitive dot remains in darkness. We have used a solid line curve E to represent a case with illumination, and a curve of dashes, marked 0, to represent a case with zero illumination or darkness. The signal illumination creates a drop in voltage $\Delta VS$ of the voltage VA at the point A. This variation in voltage $\Delta VS$ is linked to the charge that has collected at the point A, under the effect of the signal illumination, by the following relationship:

$$\Delta VS = \frac{QS}{Ca + Cb}$$

where Qs is the signal charge generated by either of the two diodes Da and Db. A value VA4 of the voltage VA, due to the signal voltage variation $\Delta VS$, is reached at the instant t3 which marks the end of the exposure period. If we overlook the above-mentioned dark currents, the value VA4 of the voltage VA is preserved until an instant t4 when there starts a second reading pulse IL2 with one and the same amplitude VL1 as the first reading pulse IL1. It has to be noted that, during the period TL of the reading pulses IL1, IL2, the read resetting switch IL1 to IL3 is open, so as to enable the integration of the charges which have collected at the point A and which will be transferred to the column electrode and the corresponding integrator amplifier by the reading pulse which follows an exposure to light.

At the instant t4, at the same time as the second reading pulse IL2 starts, the voltage VA is equal to the voltage VA4, and it is increased by a value corresponding to $\Delta VC$, i.e. the voltage VL1 which is multiplied by the ratio $$\frac{Ca}{Ca + Cb}$$

i.e. by one and the same quantity as at the instant t1, but with an opposite sign. When the variation $\Delta VC$ is achieved, the voltage VA has a value $V_{DLE}$ that corresponds to the value at the start of the reading after illumination. Then the voltage VA increases, and tends towards the value VL1 until an instant t5 which marks the end of the second reading pulse IL2.

At the instant t5, the voltage VA has reached a value $V_{FLE}$ which corresponds to the value at the end of reading after illumination, and is smaller than the value VL1 of the reading pulse IL2. With the end of this reading pulse, the voltage VA shows a variation $-\Delta VC$ similar to that of the instant t1.

If we now look at the curve 0, in dashes, which represents the case where the photosensitive dot P1 has remained in darkness: the value VA3 that the voltage VA had at the instant t2 is kept until the instant t4. At the instant t4 (which corresponds to the start of the second reading pulse IL2), the voltage VA increases by $+\Delta VC$ to reach a value $V_{DLO}$ corresponding to the value at the start of reading after darkness. Then, until the instant t5, the voltage VA increases and tends towards the value VL1 reaching, at the instant t5, a value $V_{FLO}$ which is the value at the end of reading after darkness. This last value $V_{FLO}$ is greater than the value at the end of reading after illumination, and smaller than the value VL1 of the reading pulse IL2.

It is clear, in FIG. 2, that the voltage VA has a value $V_{FLO}$ at the end of reading after darkness which is greater than the value $V_{FLE}$ at the end of reading after illumination. This shows that a certain quantity of the signal charge QS has not been transferred, i.e. read. Between the instant t4 and t5, the increase in the voltage VA in the case of darkness, between the voltage $V_{DLO}$ and $V_{FLO}$ corresponds to a dark charge Q while, at the same time, the increase in the voltage VA in the case of illumination corresponds to an illumination charge Q. The quantity of charges read QL between the instant t4 and the instant t5 is equal to:

QL = Q illumination − Q darkness $QL = Cb.(V_{FLE} - V_{DLE}) - Cb.(V_{FLO} - V_{DLO})$, $QL = Cb.(V_{DLE} - V_{DLO}) - Cb.(V_{FLE} - V_{FLO})$, $QL = Cb. \Delta VS - Cb.(V_{FLE} - V_{FLO})$.

This has to be compared with what would be read if the first diode DA were to be an ideal switch in parallel on the capacitor Ca. The quantity of charges Qli ideally read would be equal to $Cb.\Delta VS$.

There is therefore a non-read charge equal to $Cb.(V_{FLE} - V_{FLO})$, from which there results a reading error and a reduction in the sensitivity of the device.

For the reading error to be the minimim, the value of the voltage VA at the point A at the end of the reading time TL would have to be independent of the value of the voltage Va at the start of the reading pulse, i.e. of the time TL.

It is, of course, possible to reduce $V_{FLE} - V_{FLO}$ by increasing the duration TL since the voltage VA tends towards the value VL1 in all cases (although the voltage VA at the point A can only reach a value that is slightly smaller than the value VL1 of the reading pulses, owing to the conduction threshold voltage (also called the bend voltage) of the first diode Da). However, in practice, the duration TL of the reading time is imposed and should be as short as possible, and this approach is therefore not applicable.

Another drawback of the incomplete reading is that the unread charge remains at the point A. The result of this is that at each start of a cycle (corresponding to the instants t1 and t5 in FIG. 2a, there is a memory of what has happened in the preceding cycle. There is therefore a remanence of the detector.

Figure 3:
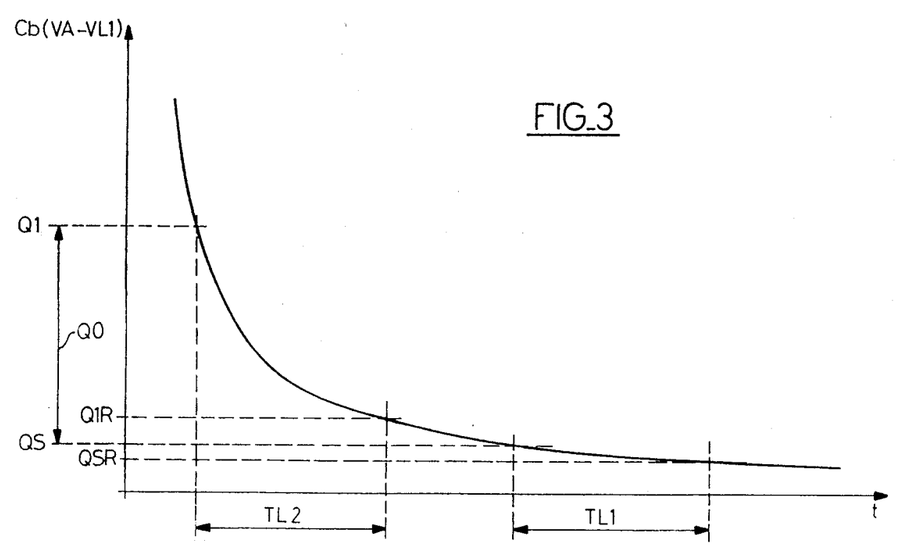
FIG. 3 is a graph which can be used to illustrate both the reading errors in the case of a standard reading method and the advantages provided by the reading method according to the invention.

FIG. 3 shows a curve representing the quantity of charges that remain to be discharged from the point A, accumulated by the capacitor Cb formed by the second diode Db, i.e. to completely initialize the point A at the value VL1 (barring the conduction threshold voltage), giving the curve $Cb.(Va - VL1) = f(t)$. This curve corresponds to the discharge of the capacitor Cb through the first diode Da when it is forward biased. This curve therefore has the equation:

$$\frac{d\, Cb.\, (VA - VL1)}{Cb.\, (VA - VL1)} = -\frac{dt}{Rd_{Da} \cdot Cb}$$

where $Rd_{Da}$ is the dynamic resistance of the first diode Da in forward bias. This is therefore a curve with an almost exponential form (it would be exponential if $Rd_{Da}$ were independent of the time).

If there is a reading time TL1 available to read a signal charge QS, it is seen that a residual charge QSR may be very great with respect to the signal charge QS, and the reading error $$\epsilon 0 = \frac{QSR}{QS}$$

is all the greater as the the signal charge QS is low.

The approach proposed by the method of the invention consists in the addition, to the signal charge QS, of a charge Q0, called a driving charge, so as to accumulate a total charge Q1 at the point A, such that $Q1 = Q0 + QS$.

Thus it is seen, on the curve of FIG. 3 that, at the end of a reading time TL2, with a duration equal to the previously examined reading time TL1, the unread charge of the total charge Q1, i.e. a residual charge Q1R, is such that the reading error ϵ1 is smaller than the reading error ϵ0 of the previous case, with:

$$\epsilon^1 = \frac{Q1R}{Q1}$$

where
$Q1R = \epsilon 1.Q1$,
$Q1R = \epsilon 1.(Q0 + QS)$,
$Q1R = \epsilon 1.QS + \epsilon 1.Q0$,
$Q1R = \epsilon 1.QS + constant$ We see that it is thus possible, through the driving charge Q0, to read the signal charge QS more efficiently, to within the nearest value of a constant.

Figures 4A, 4B:
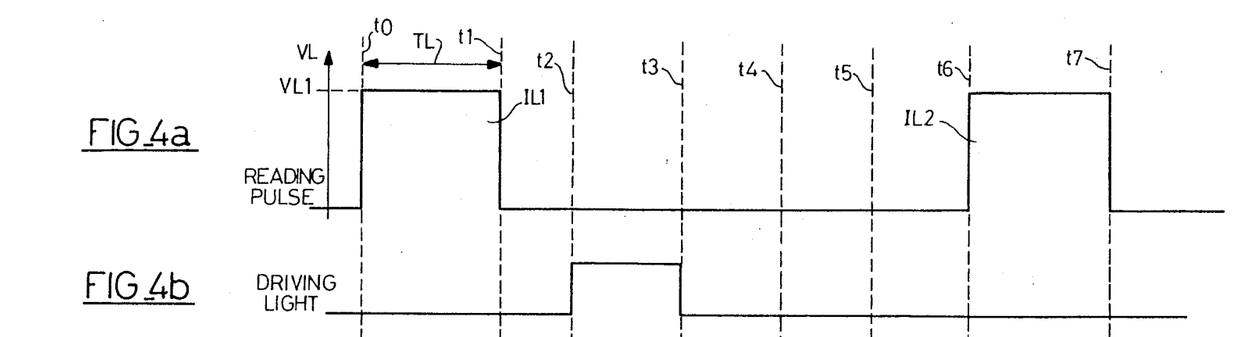
FIGS. 4a to 4e are graphs of signals explaining the reading method according to the invention, according to a first variant of this invention.

According to a characteristic of the method of the invention, the driving charge Q0 is added by means of an illumination of the photosensitive dot P1 to P9 which may be either permanent or in the form of only a light pulse which may be, for example, as in the non-restrictive example shown in FIG. 4b, produced between the end of a reading pulse IL and the start of a signal illumination.

It must be noted that the physical structure of a photosensitive matrix as shown in FIG. 1, with two diodes, mounted in series and upside down with respect each other, for each photosensitive dot P1 to P9, may be achieved in any way, for example according to the teaching given in the already mentioned French patent application No. 86 14058, which describes an embodiment wherein the substrate is made of glass or quartz so as to be transparent to light. The light source (not shown in the present description) used to this effect may be placed flat against this substrate, and it may be formed by means known per se, for example a luminous panel, or by a system of electroluminescent diodes as is described, for example, in the French patent application No. 86 06344. It is naturally preferable for the chosen light source to enable good reproducibility of the quantity of driving charges Q0, from one image cycle to another, so that this quantity of charges can be considered as a simple threshold.

FIGS. 4a to 4e illustrate a first exemplary embodiment of the method of the invention, wherein the driving charge Q0 is formed by a light pulse or driving illumination which is located between the end of a reading pulse IL and the start of a signal illumination by a useful signal.

Figure 4C:
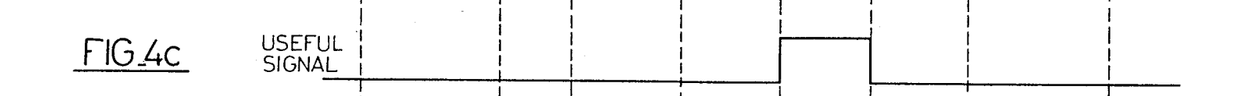
Figure 4D:
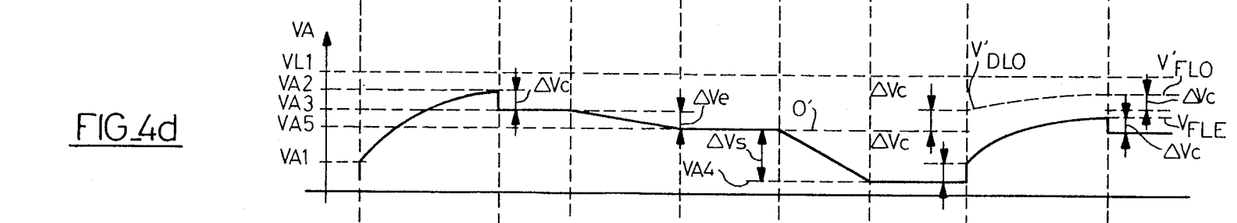
Figure 4E:
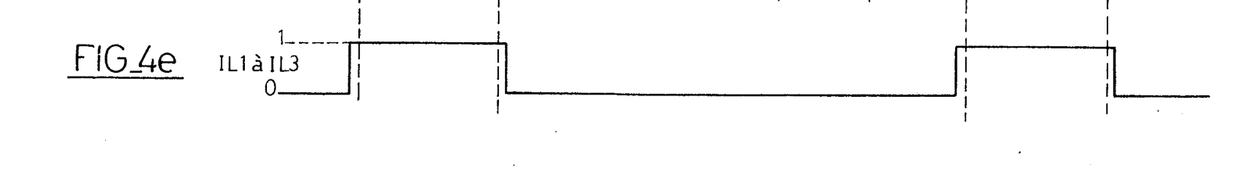

FIG. 4a shows the reading pulses IL which carry the voltage VL of the row conductors to a value VL1 that is positive with respect to the reference voltage VR. FIG. 4b enables the driving illumination stage to be located in time. FIG. 4c represents the signal illumination pulse. FIG. 4d represents the values of the voltage Va at the point A. FIG. 4e illustrates the open state (1) or closed state (0) of the resetting switches IL1 to IL3, for which it can be noted, as of now, that they permit the integration, by the amplifiers G1 to G3, of the charges that have collected at the point A during the reading pulses IL1, IL2.

As in the example of FIG. 3, the instant t1 corresponds to the descending edge of a reading pulse IL1 which has lasted for a period TL from the instant t0. The setting up of the first reading pulse IL1 at the instant t0 has led the voltage VA to reach a value VA2, at the instant t1, which is smaller than the value VL1. With the descending edge of the first reading pulse IL1, the voltage VA decreases to a value VA3 following a voltage variation $-\Delta VC$.

The voltage VA keeps the value VA3 up to an instant t2 when a driving illumination starts. This driving illumination is applied up to an instant t3. Between the instant t2 and the instant t3, under the effect of the charges generated by the driving illumination, the voltage VA decreases and goes to a value VA5, giving a variation $\Delta Ve$ which corresponds to the above-mentioned driving charge Q0. From the instant t3 onwards, the voltage VA keeps its value VA5 up to an instant t4 when the signal illumination starts. This signal illumination lasts up to an instant t5.

Under the effect of the signal illumination, a signal charge QS is generated at the point A and causes a variation $\Delta VS$ of the voltage VA. This variation $\Delta VS$ is a decreasing variation which is added to the variation $\Delta Ve$ (representing the driving charge Q0) to bring the voltage VA to the value VA4 for example. The value VA4 of the voltage VA is kept until an instant t6 when a second reading pulse IL2 starts. The voltage VA shows an increase $\Delta Vc$ from where onwards it increases and tends towards the value VL1 of the reading pulse IL2. At the instant t7, which corresponds to the end of the reading pulse IL2 and to the start of a following cycle, the voltage VA reaches a value $V_{FLE}$, i.e. the illumination reading end value, and shows a decrease corresponding to the variation $\Delta Vc$.

If, from the instant t4 onwards, we look at a curve, drawn with dashes and marked O′, representing an absence of signal illumination, i.e. darkness, it is seen that the voltage VA in this case keeps the value VA5 up to the reading pulse starting instant t6. The value VA then goes to a value $V'_{DLO}$ by a variation $\Delta Vc$ similar to the example of FIG. 2, and then increases to tend towards the value VL1 up to the reading pulse ending instant t7. At the reading pulse ending instant t7, the voltage VA has a dark reading end value $V'_{FLO}$ smaller than the value $V_{FLO}$ that it had in the example of FIG. 2. This is because of the presence of the driving charge Q0. This means that the error in the reading is smaller than in the case of FIG. 2, namely, smaller than in the prior art. It should be noted that this improvement is related to the fact that, through the driving charge, the voltage value between the reference potential VR and the voltage at the point A is reduced and, consequently, the amplitude VL1 of a reading pulse IL1, IL2 becomes sufficient to forward bias the first diode Da with a strong current, i.e. with a low dynamic resistance $Rd_{Da}$.

It must be noted that, between two reading pulses IL1, IL2, all the rows L1 to L3 of the photosensitive matrix can be read in a standard way and, to simplify the depiction of FIG. 4, the time scale has not been maintained. The reading of the other rows must be done between the instant t1 and the instant t2. This is applicable to the FIGS. 2, 4 and 5. In these figures, however, the instant when the integrator is put into operation is shown for only one line.

Figures 5A, 5B:
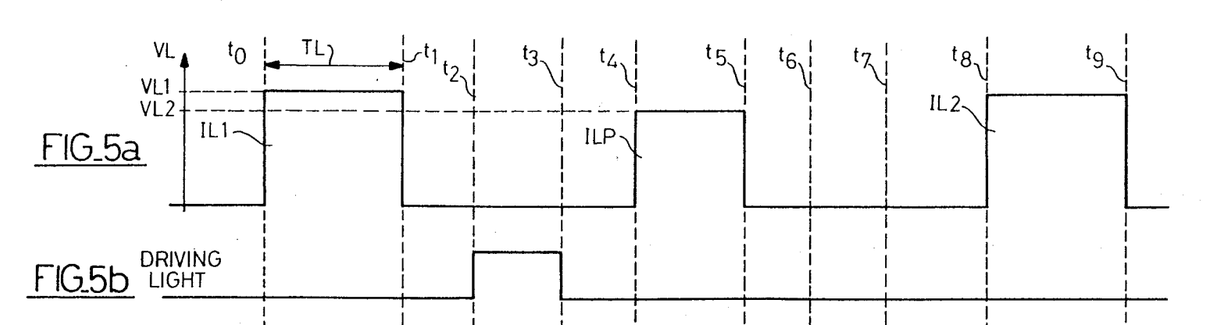
FIGS. 5a to 5e are graphs of signals explaining the reading method according to the invention, according to a second variant.
Figure 5C:
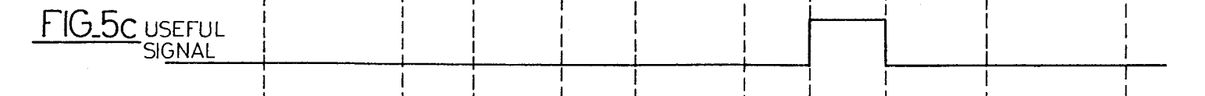
Figure 5D:
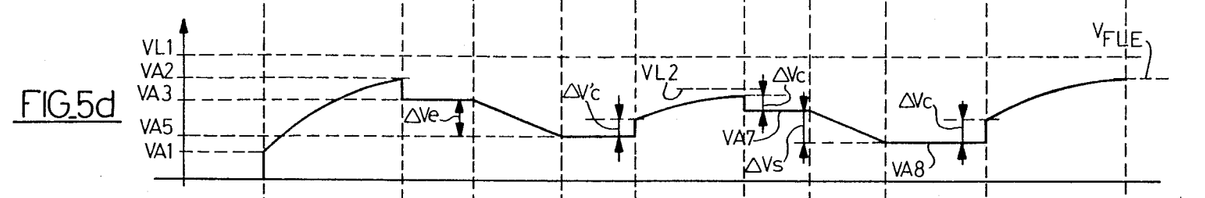
Figure 5E:
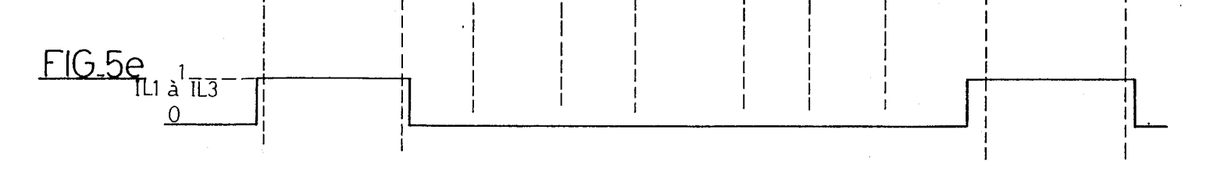

FIGS. 5a to 5d are graphs of signals explaining the reading method according to the invention, according to a second variant of this invention. FIG. 5a shows reading pulses IL1, IL2 which are applied, as earlier, to the first row conductor L1 with an amplitude VL1. Furthermore, between two reading pulses IL1, IL2, a partial reading pulse ILP is applied. This partial reading pulse ILP has a same bias as the reading pulses but an amplitude VL2 which is smaller than the amplitude VL1. FIG. 5b shows the driving illumination. FIG. 5c shows the signal illumination. FIG. 5d shows the values of the voltage VA at the point A; FIG. 5e illustrates the open state (1) or closed state (0) of the resetting switch I1 to I3, and shows that the integration of the charges collected at the point A by an amplifier G1 to G3 is permitted for the duration of a reading pulse IL1, IL2.

As in the preceding examples, the instant t1 corresponds to the end of a reading stage of the preceding cycle, namely to the end of a reading pulse IL1 which, from the instant t0 onwards, has lasted for a period TL. The instant t1 thus marks the descending edge of the first reading pulse IL1, and a variation $\Delta VC$ of the voltage VA at the point A which goes from the value VA2 to the value VA3. Thus, the instant t1 marks the end of the stage of reading all the photosensitive dots of the first row conductor L1. Between the instant t1 and an instant t2, the reading of all the other rows of the matrix (not shown in FIGS. 5a to 5e) is ended. The value VA3 of the voltage VA is preserved until the instant t2. From the instant t2 to the instant t3, the driving charge QO is created, for example for all the photosensitive dots of the matrix, in sending a driving illumination for the entire detector panel. The effect of the driving illumination, at the first photosensitive dot P1 for example, is to cause a variation $\Delta Ve$ in the voltage VA as in the example of FIG. 4, this variation $\Delta Ve$ leading to a reduction in the voltage VA which goes from the value VA3 to the value VA5.

The voltage VA keeps the value VA5 until an instant t4. At the instant t4, a partial reading pulse ILP, with an amplitude VL2, is sent either simultaneously or successively to all the row conductors L1 to L3. This partial reading pulse ILP should have an amplitude VL2 which is smaller than the amplitude VL1 of a reading pulse IL1, IL2 and greater than the voltage VA5, namely greater than the voltage that exists at the instant t4 between the point A and the reference voltage VR. Thus, the partial reading pulse enables a partial reading to be made of the driving charge QO present at the point A, i.e. to eliminate a part of this driving charge. The result thereof is that, after an instant t5 which marks the end of the partial reading pulse ILP, the voltage VA has increased and the value VA7 of the voltage VA no longer depends on any other factor than the amplitude VL2 of the partial reading pulse. This means that spatial or temporal dispersals in the driving illumination can be tolerated. In particular, the temporal fluctuations of this illumination which, at the least, are equal to its quantum fluctuations, are thus eliminated.

To end the explanations relating to this last version of the method of the invention, with the application of the partial reading pulse ILP, the voltage VA shows an increase $\Delta Vc'$ which depends on the amplitude VL2 and on the ratio of the capacitance of Ca, Cb, the first diode being then reverse biased. Then, the voltage VA increases and tends towards the value VL2 until the instant t5, and then shows a reduction $-\Delta Vc$ by capacitive division, which gives it a value Va7. The value VA7 of the voltage VA is kept up to the instant t6, when the signal illumination starts. This illumination signal lasts up to an instant t7. Between the instant t6 and the instant t7, the voltage VA is reduced by a variation $\Delta Vs$ caused by the accumulation of the quantity of signal charges QS at the point A. The voltage VA then has a value Va8 which it keeps up to the instant t8 which marks the start of the second reading pulse IL2. As in the preceding examples, the voltage VA then shows a fast increase $\Delta Vc$, and then increases more slowly until it reaches an illumination reading end value $V_{FLE}$ at an instant t9 which marks the end of the second reading pulse IL2. The second reading pulse IL2 has enabled the reading of the signal charge QS to be done. To this signal charge QS, there is added a residual driving charge Q0' which corresponds to the remaining part of the driving charge, i.e. the part not substracted at the point A during the partial reading, between the instants t4 and t5, by the partial reading pulse ILP.

This second variant of the method can be used if the driving illumination has caused the voltage VA to drop, so that the voltage VL2 of the partial reading pulse ILP is greater than this voltage VA by a quantity which is at least equal to the value of its direct conduction threshold value.

It should be noted that the implementation of the method of the invention is all the more worthwhile as the second diode Db, in reverse bias, has a capacitance value of Cb which is great as compared with the capacitance value of Ca shown by the first diode Da in reverse bias. In effect, generally, for one and the same illumination, a photodiode having a higher capacitance value in reverse bias generates a greater quantity of charge. This means that when a photosensitive dot P1 to P9 is illuminated, the main part of the charges is generated by the second diode Db. This is particularly well suited to the production of a driving charge Q0, generated by a driving illumination, the first diode Da being possibly "blind".

What is claimed is:

1. A method for the reading of at least one photosensitive dot comprising a first diode and a second diode, mounted in series, with opposite directions of conduction, at least the second diode being photosensitive, said method consisting in the reverse biasing of the two diodes during the exposure of the photosensitive dot to a useful signal, so as to accumulate a quantity of signal charges in a zone with floating potential located at the connection between the two diodes, then in the forward biasing of the first diode during the stages of reading by periodic reading pulses, said method further consisting in the illumination of the photosensitive dot by an additional illumination or driving illumination to generate, in the zone with floating potential, driving charges which get added at least partially to the signal charge.

2. A method according to claim 1, applicable in the case where the second diode is a photodiode which, when it is reverse biased, has a greater capacitance than a capacitance shown by the first diode when this latter diode is reverse biased.

3. A method according to claim 2, wherein the capacitance of the second diode is at least ten times greater than the capacitance of the first diode.

4. A method according to claim 1, wherein the additional illumination is formed by a light pulse.

5. A method according to claim 1, wherein the additional illumination is formed by a light pulse applied to the photosensitive dot between the end of a reading pulse and the start of the exposure of the photosensitive dot to a useful signal.

6. A method according to claim 1, the charges generated in the zone with floating potential causing, in said zone, a reduction in the voltage with respect to a reference potential, said method consisting in the illumination of the photosensitive dot by the additional illumination or driving illumination so as to bring the voltage of the zone with floating potential to a given value, and then in the application, to the photosensitive dot, of a partial reading voltage pulse having, with respect to the reference voltage, an amplitude greater than said given value and smaller than the amplitude of a reading pulse.

* * * * *